Figure 1:
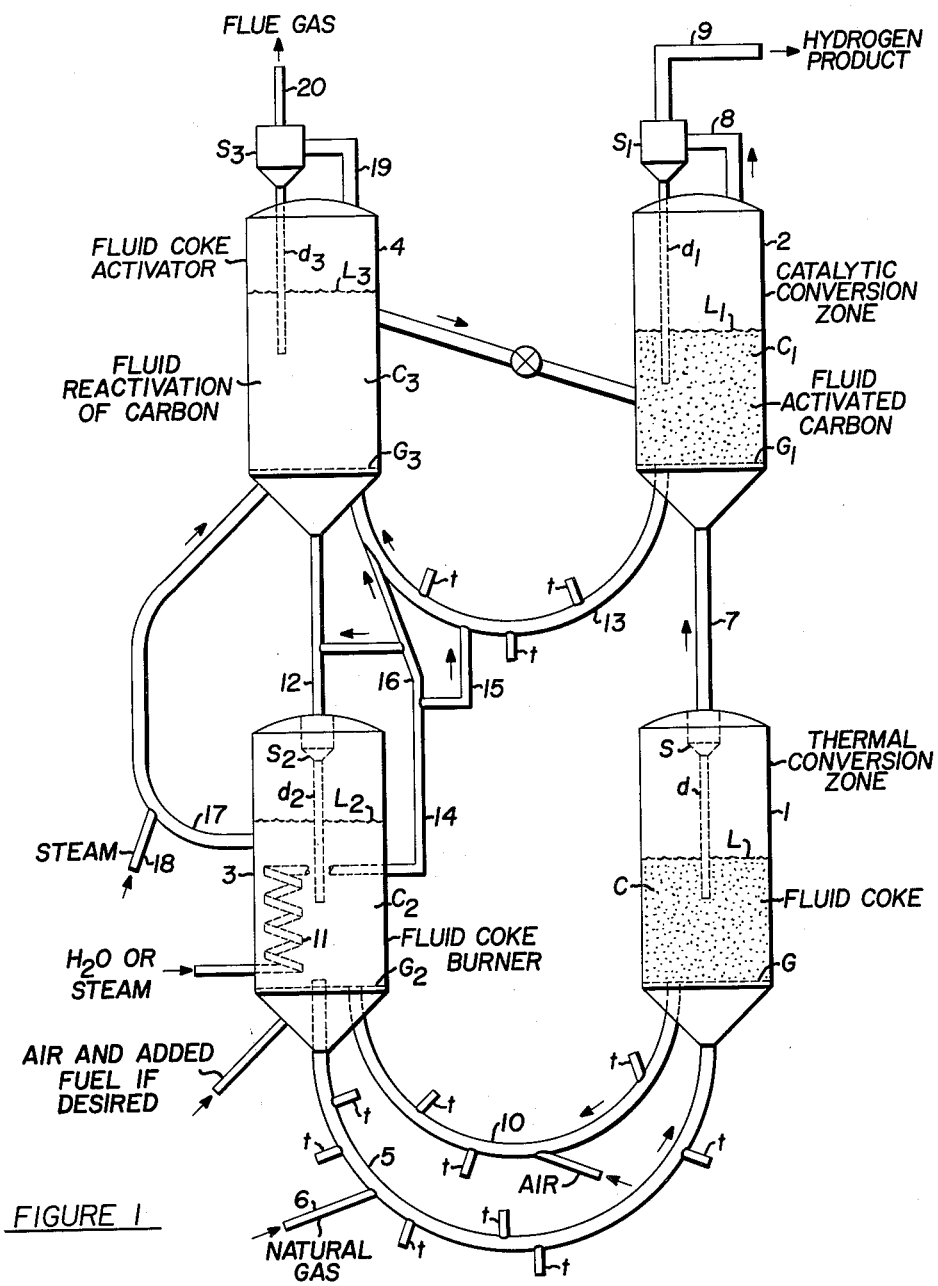

May 23, 1961  W. F. AREY, JR  2,985,512
MANUFACTURE OF HYDROGEN
Filed April 14, 1959  2 Sheets-Sheet 1

William Floyd Arey, Jr. Inventor

By J. Cashman Attorney

United States Patent Office 2,985,512
Patented May 23, 1961

2,985,512

MANUFACTURE OF HYDROGEN

William Floyd Arey, Jr., Baton Rouge, La., assignor to Esso Research and Engineering Company, a corporation of Delaware Filed Apr. 14, 1959, Ser. No. 806,392

9 Claims. (Cl. 23—212)

This invention relates to the production of hydrogen and carbon. More particularly, the present invention relates to a continuous method for cracking natural gas or methane utilizing a fluidized bed of coke solids, more particularly fluidized coke obtained from petroleum residuum or coal.

Heretofore and prior to the present invention, it has been proposed to produce hydrogen from methane or other low molecular weight hydrocarbons by high temperature cracking treatment, say, at temperatures of the order of about 1800°–2600° F. and without fluidized catalytic coke. The ultimate products of this reaction are hydrogen and carbon.

Because of the high temperatures involved, it has been the practice in the past to carry out the process by the so-called blow and run type of operation. In this operation the hydrocarbon gas is first passed over highly heated refractory brick which may be in the form of checkerwork. The process is continued until the temperature is reduced below active cracking temperature. After that the feed of gas is discontinued and the refractory material is reheated by burning the carbon formed thereon during the on-stream phase. Following this reheating, the cracking of the hydrocarbon gas is resinstituted. This type of operation has many disadvantages. The principal disadvantage is that the process is essentially adiabatic, whereas, it would be much more desirable to carry out the cracking operation under substantially isothermal conditions. Another disadvantage of this type of operation is that during the initial period of the on-stream phase of the cycle of steps, the hydrogen is contaminated with nitrogen, carbon dioxide and other combustion gases which are absorbed on the refractory material during the heating phase.

Hydrogenation is a process of great potentiality in petroleum processing, but heretofore it has had limited application due mainly to the cost of producing hydrogen. Insofar as is known, industrial hydrogen has been produced from methane or natural gas in this country by an operation called reforming. This is a two stage operation in which methane is converted to CO and hydrogen by treating the methane with steam at temperatures around 1600° F. in the presence of a catalyst. The product of this reforming step is then subject to further treatment with steam to convert the carbon monoxide to carbon dioxide and to cause the formation of a further quantity of hydrogen. The product of the second step consists mainly of hydrogen and carbon dioxide. The carbon dioxide is dissolved out of the mixture, leaving a commercially pure hydrogen.

One of the objects of the present invention is to produce hydrogen by a cracking operation under conditions and in such a manner that the process may be operated continuously.

A specific object of the present invention is to produce hydrogen by an improved process from methane or natural gas.

Other and further objects of the invention will appear in the ensuing description and claims read in connection with the accompanying drawing.

Figure 2:
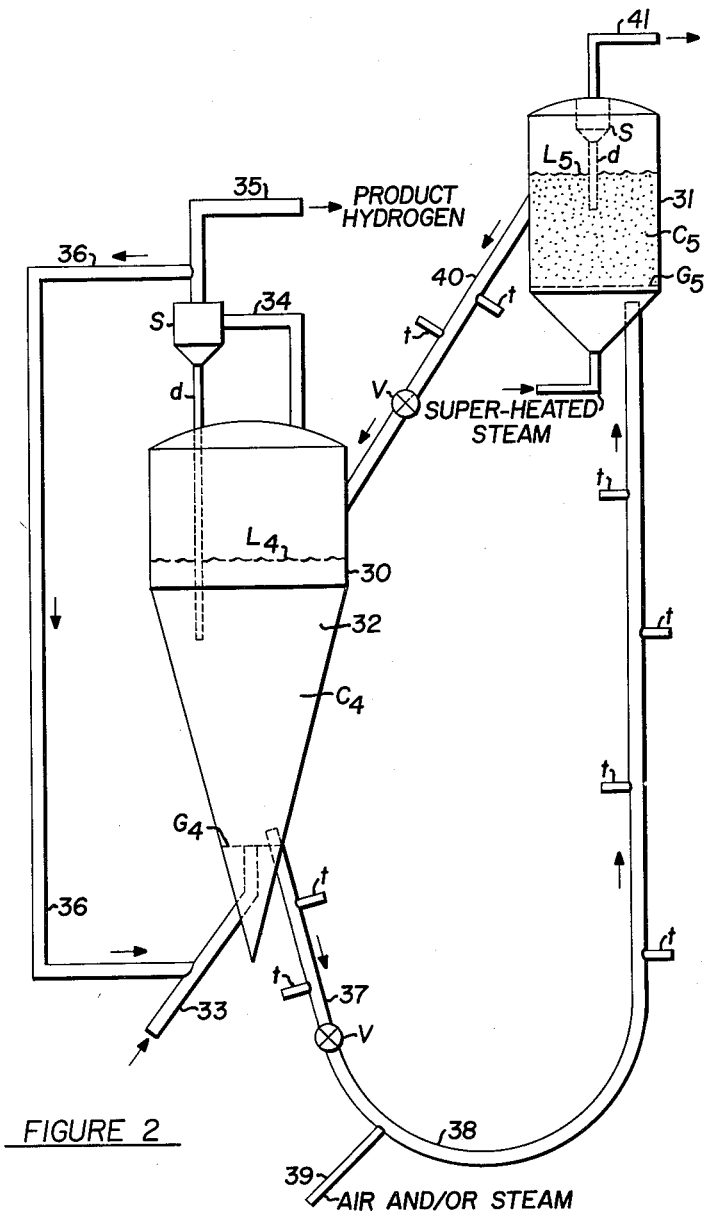

In the accompanying drawing,

Fig. 1 represents an apparatus layout comprising a two zone cracking system for the conversion of methane or natural gas to hydrogen and carbon; and Fig. 2 represents a modification of the invention in which the catalytic conversion of gaseous hydrocarbon to carbon and hydrogen is carried out employing a conical shaped reactor.

Referring in detail to Fig. 1 the apparatus shown consists essentially of a four vessel system, to wit, a first reaction zone 1, a second reaction zone 2, a heating zone 3 and a carbon reactivation zone 4. When operating the process, natural gas is charged to a lower portion of a standpipe 5 carrying the usual fluidizing gas taps $t$, through line 6 and serves as a carrier gas to transport, in suspension, powdered coke charged to line 5 from the standpipe into a first conversion zone 1. In this zone the natural gas is heated to temperatures sufficiently high to crack the methane contained in the natural gas to form hydrogen and carbon, the cracking operation occurring in the presence of a fluidized bed of the powdered coke C, positioned between a gas distributing means G, which may be an ordinary grid or screen and an upper dense phase level L. The cracking which occurs in reactor 1 is a cracking operation at lower catalytic activity, and as hereinafter pointed out, the temperatures prevailing in zone 1 are substantially below those temperatures which would cause substantially complete conversion of the methane to carbon and hydrogen. These temperatures are purposely maintained below temperatures which would insure complete conversion of the methane to carbon and hydrogen. In order to maintain the bed of coke C in the form of a well fluidized dense bed, the said coke should have a particle size such that 60–70% of the bed would have a particle size of from 40–80 microns. It should also contain some fines, say, 5–20 wt. percent of material having a particle size of from 5–20 microns. It should contain some coarser material having a particle size of from 80–200 microns, say, 5–25 wt. percent, the balance having a particle size of from 20–40 microns. The superficial velocity of the gasiform material flowing through the bed should be maintained at from about ½–3 ft. per second.

The gaseous product formed in bed C of reactor 1 passes from the said bed to a disengaging space disposed between L and the top of the reactor, and in this space the main bulk of solids entrained therein is separated from the gasiform material and returned to the bed C by gravity. The carbon formed is deposited on the particles comprising the bed. Before the product is withdrawn from the reaction zone, it is forced through one or more gas-solids separating devices S wherein fines persisting in the gasiform material are removed and returned to the bed C through one or more dip pipes $d$. This partially converted material then issues from reactor 1 through line 7 and passes into a second conversion zone 2 containing a fluidized bed of coke $C_1$ having roughly the same particle size distribution as that in the bed C in reactor 1. The coke comprising the bed $C_1$, however, has been activated so that it serves as a catalyst for the conversion of the methane to carbon and hydrogen, and as subsequently explained, this permits operation at a substantially lower temperature than would be required were the catalyst omitted. The bed $C_1$ extends from a gas distributing means $G_1$ to an upper dense phase level $L_1$. In this bed of catalytic coke $C_1$, the conversion of the methane is substantially completed, the carbon again deposited on the particles of the bed $C_1$ while the product passes into a disengaging space positioned between $L_1$ and the top of the reactor wherein the main portion of the solids are separated from gasiform material and returned by gravity to the bed $C_1$. The product issues from the upper portion of the reactor or converter 2 through pipe 8 and is passed through one or more gas-solids separators $S_1$ commonly called cyclones wherein entrained fines are separated and returned to the bed $C_1$ through one or more dip pipes $d_1$. A gas rich in hydrogen is recovered overhead from the cyclone or cyclones through pipe 9 and delivered to storage (not shown).

Since the cracking of methane is an endothermic reaction, heat must be supplied thereto, and the present invention involves heating supply means comprising burning a portion of the carbon formed in the process in, say, reactor 1 in a burner 3 and transporting the thus heated coke to reactor 1 through a standpipe 5, which standpipe is provided with the usual gas taps $t$. The coke is withdrawn from vessel 1 through an aerated transfer line 10 carrying the usual fluidizing gas taps $t$ and charged to burner 3 as shown. The method of transferring solids between vessels 1 and 2 is well known and has been described fully in the prior art and need not, therefore, be described in greater detail herein. The fluidized bed of coke $C_2$ which extends from foraminous member $G_2$ to upper dense phase level $L_2$ is formed in the same manner as previously described in connection with the formation of fluidized bed C in reactor 1. In order to form and/or superheat steam necessary in the operation of this process, water or steam is injected into a coil 11 disposed in the fluidized bed of solids $C_2$ and under the conditions prevailing in the said bed $C_2$ the steam is formed and/or superheated. The fumes formed during the burning of the carbon or coke comprising bed $C_2$ pass from the said bed through a solids disengaging space positioned between $L_2$ and the top of the burner, and in this space the main bulk of entrained solids are separated from the fumes and returned to the bed $C_2$ by gravity. Before the fumes issue from the burner 3, they may be forced through one or more gas-solids separating devices $S_2$ wherein entrained solids are removed and returned to the bed $C_2$ through dip pipes $d_2$. These fumes issue from the burner through line 12 and are charged into the bottom of a reactivation zone 4 containing a fluidized bed of coke $C_3$ extending from a gas distributing means $G_3$ to an upper dense phase level $L_3$ formed in precisely the same manner as that described in causing the formation of bed C in reactor 1. The solids charged to reactivation vessel 4 are obtained from conversion zone 2 through a transfer line 13 provided with the usual fluidizing gas taps $t$. Steam from coil 11 is withdrawn through pipe 14 and charged to transfer line 13 via branch pipes 15 and 16, respectively, so that the gasiform material contacting the bed of coke solids $C_3$ in reactivator 4 comprises a mixture of fumes from burner 3 and superheated steam. The coke in vessel 4 undergoes reactivation, and this reactivated material is charged to vessel 2 in desired amounts and serves as a catalytic material in the latter vessel. Additional coke may be supplied to vessel 4 from vessel 3 by withdrawing coke from vessel 3 into line 17 to which line steam is also charged from line 18, the said steam serving as a gas lift to transport the withdrawn coke to reactivator 4.

The fumes and other gaseous material contacting bed $C_3$ issue from said bed and pass into a disengaging space positioned between $L_3$ and the top of the reactivator and solids entrained therein are separated therefrom and returned by gravity to bed $C_3$. The fumes issue from the vessel 4 through line 19 and are then forced through one or more gas-solids separating devices $S_3$ wherein solid fines are separated and returned to the bed $C_3$ through one or more dip pipes $d_3$. The flue gases are rejected from the system through line 20 and their sensible and chemical heat may be recovered in equipment such as a waste heat boiler (not shown) and the steam thus formed may be utilized in the present system.

Referring to Fig. 2 the apparatus depicted there involves essentially a two vessel system comprising a reactor or converter 30 which is in the form of a cone and a reactivator 31. The reactor contains a plurality of baffles (not shown) but located in the conical section 32 and which serve to hinder back-mixing of a fluidized bed of coke solids $C_4$ which are disposed in converter 30 extending from a gas distributing means $G_4$ to an upper dense phase level $L_4$.

In operation, methane or natural gas is charged to the bottom of reactor 30 and passes upwardly through gas distributing grid $G_4$ into the bed of catalyst $C_4$. The conical shape of the bed $C_4$ tends to maintain the gas velocities substantially constant, and as previously stated, the baffles hinder back-mixing of said solids. The bed of solid $C_4$ is activated carbon, such as that obtained by steam activation of powdered coke formed in the cracking process which carbon has the particle size distribution previously described in connection with the description of the operation carried out in the apparatus indicated in Fig. 1. As previously mentioned herein, activated carbon has a catalytic effect in the cracking of the methane or natural gas and thereby permits operation at a lower temperature than when operating thermally. However, in the cracking process, make carbon is deposited on the steam activated coke and as a result, the activated carbon depreciates in surface area and with it, in catalytic activity. When the surface area of the carbon falls below 7 square meters per gram, its catalytic activity is greatly lowered. It has further been observed that the surface area can fall to substantially zero when the amount of make carbon is less than that required to fill the pore volume of the activated coke. This is undoubtedly due to the make carbon plugging the pore openings rather than filling up the pores. This is illustrated by the following experiment.

Steam-activated coke having a surface area of 355 square meters per gram and a pore volume of 0.2 cubic centimeter per gram was employed as a catalyst for cracking natural gas to yield hydrogen. After contacting 70.5 grams of this activated carbon with 7.8 grams of natural gas at 1900° F., the surface area declined substantially. The methane conversion had been 85% so the total of 4.8 grams of made carbon was deposited. Assuming a density of 1.5 grams per cubic centimeters for this made coke, the amount deposited would be 3.2 cubic centimeters. The 70.5 grams of activated coke charged had a pore volume of 0.2 cubic centimeter per gram, as previously stated, or a total pore volume of 14.1 cubic centimeters so that the made coke occupied only about 23% of the total pore volume available. Consequently, the loss in surface area must have been due to the plugging up of the pore openings. This could be prevented by a more even deposition of the carbon on the surface of the activated carbon. The present invention by the means illustrated in Fig. 2 provides for a more even distribution of the made carbon on the surface, and consequently, a much better utilization of the activated carbon can be obtained. This result is obtained by contacting the feed gas countercurrently with the fluidized activated coke under the conditions prevailing in reactor 30; in other words, under conditions such that there is a minimum of back-mixing of the solids. It is preferred that the velocity through reactor 30 be substantially constant. This result is attainable by employing a conical shaped reactor equipped with baffles. This type of reactor permits the flow of hot freshly activated carbon from the top of the reactor toward the bottom thereof. Gas fed is introduced at the bottom and first contacts that part of the activated carbon that is nearly spent. As the gas passes upwardly, the conversion becomes progressively greater and the amount of unreacted feed becomes increasingly less with the diluted feed (containing made hydrogen) contacting the more active coke in the upper portion of the bed $C_4$. The thus diluted feed contacting coke causes the carbon deposition to be more evenly distributed over the activated coke and avoids plugging the pore openings. As the pore volume of the activated carbon gradually fills with formed or made carbon, that part of the catalytic coke is moved toward the bottom of the bed $C_4$ and progressively contacts more concecntrated feed. As will appear presently, a portion of the product hydrogen may be recycled to reactor 30 to dilute the feed and to insure a more even distribution of made carbon on the catalytic coke. In this manner maximum utilization of the steam activated carbon catalyst surface is realized. The feed is charged to a bottom portion of reactor 30 through line 33, as indicated previously, and passes upwardly into a fluidized bed of solids $C_4$, which as previously stated, comprises powdered steam activated coke. Under conditions more fully set forth hereinafter, the desired cracking occurs and gasiform material passes from the bed $C_4$ into a solids disengaging space positioned between $L_4$ and the top of the reactor in which space the major portion of the solids are separated from the gasiform material. The gasiform material is withdrawn overhead from reactor through line 34 and charged to one or more gas-solids separators S wherein entrained solids are separated and returned to the bed $C_4$ through one or more dip pipes $d$. The product is recovered overhead through line 35 and delivered to storage (not shown). As previously indicated, a portion of this product may be recycled via line 36 to be mixed with the fresh feed passing into the reactor. Solids are withdrawn from reactor 30 through standpipe 37 carrying the usual gas taps $t$ through which small amounts of gas may be injected to improve the flowability of the solids. The flow of solids in standpipe 37 is controlled by valve V. These solids are charged to an air and/or steam stream flowing in transfer line 38, the air or steam being supplied to said transfer line through line 39. The transfer line 38 is also provided with a plurality of gas taps $t$. The solids withdrawn from reactor 30 are carried in suspension into reactivator 31 where they are formed into a dense fluidized bed $C_5$ by controlling the velocity of the gas in said reactivator in the manner already described. This fluidized bed extends from the grid $G_5$ to an upper dense phase level $L_5$. Under conditions more fully set forth hereinafter, the carbonaceous solids in reactivator 31 are treated to reactivate the same, and the treated solids are returned to an upper portion of reactor 30 via a transfer line 40, carrying the usual gas taps $t$ and controlled by valve V. The fumes are withdrawn from the bed $C_5$ of reactivator 31 and passed through a disengaging space positioned between $L_5$ and the top of the reactivator, and as usual, in this space the main bulk of the solids are separated from the said fumes and passed by gravity into the bed $C_5$. Before the fumes are removed from the reactivator, they are forced through one or more gas-solids separating devices wherein entrained solids are separated and returned to the bed $C_5$ through one or more dip pipes $d$. The fumes flow from reactivator 31 through line 41 and their chemical and sensible heat may be recovered by passing them through a waste heat boiler or otherwise treated by known means and this heat may be utlized in the present system to preheat feed, to make steam or otherwise employed.

Of course, heat must be added to the cracking of the natural gas or methane in reactors 1 and 2 of Fig. 1 and reactor 30 of Fig. 2. With respect to Fig. 1, a substantial portion of the heat required is supplied by the hot solids passing from burner 3 to reactor 1. The remainder of the heat required is supplied by preheating the feed to a temperature of about 1200° F.

With respect to Fig. 2, of course, the reaction occurring in reactor 30 must be supplied with heat. This may be accomplished by any one of a number of known methods as follows:

(1) A part of the heat may be supplied by burning some of the coke in a separate vessel (not shown), or by injecting air into the transfer line leading to reactivator 31.

(2) Superheated steam may be fed to reactivator 31.

(3) The reaction of steam with coke in reactivator 31 produces water gas ($CO+H_2$) and the effluent of gas from the reactivator may be burned, and the heat thus released, is supplied indirectly to the reactivator by means not shown.

(4) By preheat in the natural gas feed or partly cracked gaseous hydrocarbon feed, similar to the high temperature feed through line 7 into reactor 2 of Fig. 1.

With respect to the design indicated in the drawing by Fig. 2, it is pointed out that the main novelty here resides in the utilization of baffles, a conical reactor and the method of contacting the feed gas with the activated carbon. As pointed out, cracking, say, natural gas results in coke being formed which carbon deposits on the steam activated carbon forming the bed. As previously indicated, this carbon may plug pores of reactivated coke. This tendency of deposited carbon to plug the pore openings is retarded by the contacting of solids and gas according to the method illustrated in Fig. 2, and such contacting effects a substantially even deposition of made coke over the entire surface of the coke particles of the bed. If the steam activated coke catalyst becomes deactivated by plugging of its pores, it cannot be reactivated to the same activity by mere burning. In order to restore the higher catalytic activity of the coke, the surface must be restored by steam activation of the coke. This steam activation with coke to make more highly activated coke requires heat, and the above methods for supplying heat may be employed.

In order to explain the invention more fully, the following directions are set forth.

*Conditions in conversion zone 1, Fig. 1*

| | Range | Preferred |
|---|---|---|
| Temperature, ° F | 1,500–2,000 | 1,800 |
| Pressure, p.s.i.g | 0–100 | 0–30 |
| Contact time, seconds | 15–2 | 3–10 |

*Conditions in catalytic converter 2, Fig. 1*

| | Range | Preferred |
|---|---|---|
| Temperature, ° F | 1,500–1,900 | 1,700 |
| Pressure, p.s.i.g | 0–100 | 0–30 |
| Contact time | 1–5 | 3 |

*Conditions in reactivators 4 and 31*

| | Range | Preferred |
|---|---|---|
| Temperature, ° F | 1,600–2,000 | 1,800 |
| Pressure, p.s.i.g | 0–100 | 0–30 |

*Conditions in burner 3, Fig. 1*

| | Range | Preferred |
|---|---|---|
| Temperature, ° F | 1,700–2,000 | 1,900 |
| Pressure, p.s.i.g | 0–100 | 0–20 |

In order to further explain the present invention, the following specific example is set forth:

EXAMPLE I

A natural gas having a methane content of 95% was charged to a fluidized bed of air activated coke and at a temperature of 2100° F., and while in contact with the said fluidized bed for about five seconds hydrogen was recovered having a purity of 95%. This operation was carried out at substantially atmospheric pressure.

EXAMPLE II

In this run the natural gas was contacted with steam activated coke at a temperature of 1800° F., and 3 seconds' contact time. A high purity hydrogen was obtained having a concentration of 96%.

The foregoing Examples I and II illustrate that for cracking with an air activated coke to obtain the same conversion to hydrogen (95%) as with the steam activated coke, the conversion temperature has to be extremely high (2100° F.) compared to 1800° F. for the activated coke and the contact times has to be about 66% longer (5 seconds compared to 3 seconds). Both these differences in temperature and time requirements are of considerable practical importance with respect to the strength of materials (reactor and refractory lining) needed to withstand such high temperatures, better heat economy and better capacity of the reactors. Therefore, a significant advantage is gained by using the steam activated coke at the permitted lower temperature level and smaller quantity of activated coke to obtain a substantial part of the conversion when the final gas product is to contain high purity hydrogen.

The relative catalytic effect of the steam activated coke for cracking hydrocarbon gases to yield hydrogen is of such magnitude that for equivalent conversion, a temperature 300° F. lower can be used with steam activated coke than with air activated fluid coke which has more catalytic effect relative to carbon formed by more cracking of the hydrocarbon without added coke. These relationships are shown by the following data:

Table I

| Operation | Temp., ° F. | Natural Gas Feed Rate, Cu. Ft./Hr. | Mol Percent $H_2$ in Exit Gas |
|---|---|---|---|
| No Coke Added [1] | 2,000 | 0.30 | 72 |
| Air Activated Coke [2] | 2,000 | 0.30 | 83 |
| Steam Activated Petr. Coke [3] | 1,900 | 0.30 | 98 |
| Activated Coal Coke [4] | 1,800 | 0.30 | 98 |

[1] Reactor tube empty except for carbon formed by cracking.
[2] Air activated coked petroleum residue.
[3] Activated coke is steam activated petroleum residuum coke.
[4] Activated coal coke, highly porous (845 m.²/g. surface).

In obtaining the foregoing comparative data, the same size reactor space was used and with same coke bed depths. The results obtained show that the steam activated petroleum coke has a definite catalytic activity beneficial for obtaining high-purity hydrogen at temperatures below those needed in using no added catalyst or using an air activated petroleum coke.

Although the steam activated petroleum coke showed a little less catalytic activity than the activated coal coke which had a surface area of about twice that of the steam activated petroleum coke (845 sq. meters per gram surface area for the commercial activated carbon compared to 356 sq. meters per gram for the steam activated petroleum coke), steam activated petroleum coke gave the advantages of much less attrition.

The activated petroleum coke, in addition to showing an unexpected high catalytic activity, was beneficially used in that during the cracking of the gaseous hydrocarbon no appreciable amount of sulfur impurities was introduced into the gas. The coke having a sulfur content of 6 to 7 wt. percent retained the same sulfur content after use in the cracking.

The freshly activated steam activated coke is suitably active when it has a surface area above 300 sq. meters per gram, or in general, the more highly activated cokes used for the second stage reaction may have a surface area of 300 to 900 sq. meters per gram.

Experimental results fully demonstrated that the steam activated petroleum coke can be used effectively for making a cracked product containing from 70 to about 98 mol percent hydrogen at temperatures of 1500° to about 2000° F. with contact times of 1 to 6 seconds, the time being shortened as the higher temperatures are used.

In the hydrocarbon gas cracking operations described, the gas feed consists substantially of hydrocarbons having 1 to 3 carbon atoms per molecule and mostly containing methane. In attempting to crack higher hydrocarbons with the fluidized coke at elevated temperatures, difficulties are experienced due to agglomeration of the coke particles starting at temperatures above 1600° F. Therefore, in the described and claimed operations the normally gaseous hydrocarbon stream is a principally $C_1$–$C_3$ hydrocarbon stream rich in methane and containing relatively small amounts of hydrocarbons higher boiling than propane, as in the analysis:

| | $H_2$ | $CH_4$ | $C_2H_6$ | $C_3H_8$ | Others |
|---|---|---|---|---|---|
| Mol Percent | 0.2 | 93 | 5 | 1 | Less than 1. |

Average typical data on the effectiveness of the steam activated petroleum coke at various temperatures is illustrated in the following table.

Table II

Conditions:
  Feed rate: 0.3 cu. ft./hr. at 80° F. of natural gas.
  8 inch bed depth, nominally.
  Contact times: 0.5 to 6 seconds.

| Solids | According to Temperatures, Mol Percent $H_2$ in Product Gas | | | |
|---|---|---|---|---|
| | 1,500° F. | 1,600° F. | 1,800° F. | 2,000° F. |
| Silica Beads | 26 | 46 | | |
| Air Activated Petr. Coke | <50 | <50 | 62 | 83 |
| Steam Activated Petr. Coke | 72 | 82 | 96 | 98 |
| Activated Coal Coke | 68 | 84 | 98 | 98 |

In the foregoing data it is shown that the steam activated coke can be used in a single stage operation for obtaining a gas having above 70 mol percent hydrogen content. However, a preferred method of operation makes use of the steam activated petroleum coke in a second stage for converting unreacted gaseous hydrocarbon in a stream which has been subjected to partial conversion in the presence of solids having lower catalytic activity, e.g., air activated coke or inert solids. In a two-stage operation, about 70 to 80 mol percent of methane conversion can be obtained in the initial stage during which about 20% to 80% of the make carbon is formed, then in the second stage, with the more activated coke used to arrive at a much higher hydrogen formation less of the carbon becomes deposited on the activated coke, thus, lowering the rate of deactivation. Consequently, with the described two-stage operation, the second stage using the steam activated coke, very short contact times can be used at suitable temperature levels, e.g., about 0.1 to 3 seconds at temperatures of 1500°–1900° F. This expedient decreases the size of apparatus and the cost of activating the coke used for gaining the high catalytic conversion effects. Thus, in a typical two-stage operation the product gas from the first stage will contain less than 83 mole percent $H_2$ and the product gas from the second stage using more active coke will contain a higher concentration of $H_2$, e.g., 90 to about 98 mol percent.

In using a two-stage operation wherein hot coke or hot solids less active than steam activated coke from a coke burner are used in a first stage to bring the gaseous hydrocarbon stream up to the cracking temperatures of 1500°–2000° F. with partial cracking, a typical gas analyses of the gas products from the first and second stages are as follows:

With air activated coke (1st stage), temperature 1900° F.

| | $H_2$ | $CH_4$ |
|---|---|---|
| Mol percent | 76.6 | 23.2 |

*With steam activated coke (2nd stage), temperature 1806° F.*

|  | H₂ | CH₄ |
|---|---|---|
| Mol percent | 95.7 | 4.2 |

In such a two-stage operation heat is supplied from the first stage by the gas product to the second stage. The contact time in the first stage is 3.3 seconds and the second stage contact time is substantially lowered to 1.0 second or less thus permitting the use of smaller quantities of the steam activated coke in the second stage to achieve the boost in the hydrogen concentration of the final gas product.

This application is a continuation-in-part of Serial Number 510,892, filed May 25, 1955, now abandoned.

Numerous modifications of the present invention may be made by those who are familiar with the art without departing from the spirit thereof.

The invention described is claimed as follows:

1. A process of producing a gas rich in hydrogen, which comprises contacting a gaseous stream consisting of normally gaseous hydrocarbon and hydrogen preheated to a temperature in the range of 1500° to about 2000° F. with finely divided steam activated coke for a contact period in the range of about 1 to 6 seconds, and recovering a resulting gas product stream consisting of hydrogen and hydrocarbon of increased hydrogen content with a relatively small amount of unconverted gaseous hydrocarbon.

2. A method of producing hydrogen and carbon by cracking a normally gaseous hydrocarbon stream, which comprises contacting said gaseous hydrocarbon stream with air activated coke particles at a temperature in the range of about 1500°–2000° F. for a time to effect a partial conversion of the gaseous hydrocarbon in said stream to carbon and hydrogen and to preheat said stream, separating the resulting gaseous stream product containing hydrogen and unconverted gaseous hydrocarbon from the air activated coke, passing said partial conversion gaseous product at 1500°–2000° F. into contact with steam activated coke to obtain further conversion of gaseous hydrocarbon in said stream to hydrogen and carbon.

3. A process for producing hydrogen gas of high purity using steam activated coke to catalyze conversion of normally gaseous hydrocarbons in a methane-rich stream consisting of said gaseous hydrocarbons, which comprises passing said stream serially through two cracking zones for contact therein with hot finely divided solids, further characterized in that the stream is first contacted with hot inert solids less catalytically active than the steam activated coke for partial conversion of the gaseous hydrocarbons to hydrogen and carbon in a first cracking zone and for raising the temperature of the gaseous stream to above 1500° F., and hot gaseous products in a stream from said first zone are contacted with hot steam activated coke in a second zone to obtain additional conversion of remaining gaseous hydrocarbons in said stream from said first cracking zone at above 1500° F.

4. The process of claim 3, wherein a temperature of 1500° to about 1900° F. is maintained in said second zone, the gas contacts with the activated coke therein for about 1 to 3 seconds.

5. A method of producing hydrogen and carbon by cracking normally gaseous hydrocarbons, which comprises contacting a normally gaseous hydrocarbon stream containing methane with a fluidized bed of hot coke solids heated by combustion of carbon thereon, maintaining the gaseous hydrocarbon stream in contact with said hot coke solids at a temperature of about 1500°–2000° F. for a period to effect a partial conversion of gaseous hydrocarbon in said stream to carbon and hydrogen in a first reaction zone, passing hot product gas containing hydrogen and unconverted gaseous hydrocarbon from said first reaction zone to a second reaction zone containing a fluidized bed of more catalytically active coke having a surface area above 300 sq. meters per gram at a lower temperature in the range of 1500°–1900° F. than that prevailing in the first reaction zone, contacting said hot product gas consisting of hydrogen and gaseous hydrocarbon with the more active coke in said escond reaction zone for a sufficient period to effect further conversion of gaseous hydrocarbon in the stream to hydrogen and carbon, and recovering from said second reaction zone a gaseous product rich in hydrogen.

6. The method set forth in claim 5, in which coke having lowered activity from deposition of carbon is withdrawn from said second reaction zone and is replaced by steam activated coke of higher activity, while hot solids lowered in temperature in the first reaction zone are withdrawn and replaced by hotter solids.

7. The method as described in claim 5, in which the product gas from the first reaction zone contains less than 83 mol percent hydrogen and the product gas withdrawn from the second reaction zone contains 90 to about 98 mol percent hydrogen, the remainder of the product gas being hydrocarbon.

8. A process for producing high purity hydrogen which comprises activating coke particles with steam to give said particles a surface area of 300 to 900 square meters per gram, then contacting a stream consisting of gaseous hydrocarbon and hydrogen with the resulting steam activated coke particles at 1500° F. to about 2000° F. in the absence of steam and of an oxide of carbon to crack catalytically the gaseous hydrocarbon and form a gas product consisting of principally hydrogen with a small amount of hydrocarbon in a cracking zone.

9. The process of claim 8, in which the coke particles are petroleum coke and in which as these coke particles become deactivated they are withdrawn from the cracking zone, reactivated with steam in a reactivation zone, then returned to said cracking zone.

References Cited in the file of this patent

UNITED STATES PATENTS

| 2,560,403 | Arveson | July 10, 1951 |
| 2,783,133 | Eastwood | Feb. 26, 1957 |
| 2,805,177 | Krebs | Sept. 3, 1957 |